(12) United States Patent
Hsu et al.

(10) Patent No.: US 11,853,818 B2
(45) Date of Patent: Dec. 26, 2023

(54) DATA SHARING SYSTEM AND DATA SHARING METHOD

(71) Applicants: Digiwin Software Co., Ltd, Shanghai (CN); DATA SYSTEMS CONSULTING CO., LTD., New Taipei (TW)

(72) Inventors: Chun-Chieh Hsu, Shanghai (CN); Shih-Shuan Hung, Shanghai (CN); Guoxin Sun, Shanghai (CN)

(73) Assignees: Digiwin Software Co., Ltd, Shanghai (CN); DATA SYSTEMS CONSULTING CO., LTD., New Taipei (TW)

( * ) Notice: Subject to any disclaimer, the term of this patent is extended or adjusted under 35 U.S.C. 154(b) by 0 days.

(21) Appl. No.: 17/839,511

(22) Filed: Jun. 14, 2022

(65) Prior Publication Data

US 2023/0281064 A1 Sep. 7, 2023

(30) Foreign Application Priority Data

Mar. 3, 2022 (CN) .......................... 202210207046.5

(51) Int. Cl.
*G06F 9/54* (2006.01)
*G06F 21/62* (2013.01)
*G06F 16/22* (2019.01)

(52) U.S. Cl.
CPC .......... *G06F 9/546* (2013.01); *G06F 16/2291* (2019.01); *G06F 21/6218* (2013.01)

(58) Field of Classification Search
CPC ... G06F 9/546; G06F 16/2291; G06F 21/6218
USPC ......................................................... 709/201
See application file for complete search history.

(56) References Cited

U.S. PATENT DOCUMENTS

| | | | | |
|---|---|---|---|---|
| 2014/0018048 A1* | 1/2014 | Anand | .................... | H04W 4/60 455/414.1 |
| 2015/0319160 A1* | 11/2015 | Ferguson | ............... | H04W 12/10 726/10 |
| 2021/0409400 A1* | 12/2021 | Palanisamy | ............ | G16B 50/30 |
| 2021/0409409 A1* | 12/2021 | Palanisamy | ............. | H04L 67/10 |
| 2022/0391523 A1* | 12/2022 | Kwong | ................. | H04L 63/104 |

* cited by examiner

*Primary Examiner* — Ruolei Zong
(74) *Attorney, Agent, or Firm* — JCIPRNET

(57) ABSTRACT

The disclosure provides a data sharing system and a data sharing method. The data sharing system includes a storage device and a processor. The processor executes multiple modules stored by the storage device. When a first software as a service (SaaS) application program sends a data sharing request to a second SaaS application program, a mutual trust relationship service module receives a request for confirmation of a mutual trust relationship transmitted by the second SaaS application program, so as to confirm the mutual trust relationship. When the mutual trust relationship is confirmed, the mutual trust relationship service module obtains virtual user identification data from a tenant management service module, and provides the virtual user identification data to the second SaaS application program, so that the second SaaS application program obtains data authority, and shares specific data to the first SaaS application program.

20 Claims, 5 Drawing Sheets

DATA SHARING SYSTEM AND DATA SHARING METHOD

CROSS-REFERENCE TO RELATED APPLICATION

This application claims the priority benefit of China application serial no. 202210207046.5, filed on Mar. 3, 2022. The entirety of the above-mentioned patent application is hereby incorporated by reference herein and made a part of this specification.

BACKGROUND

Technical Field

The disclosure relates to a data exchange technique, in particular to a data sharing system and a data sharing method.

Description of Related Art

Under the software architecture of software as a service (SaaS), ordinary users (or tenants) do not need to purchase software by themselves, and instead rent network (Web) software functions according to their needs for enterprise operation and management. In this mode, an enterprise user does not need to build and manage the software and the operating environment of the software by itself, eliminating the need to purchase and maintain the software and the necessary operating equipment of the software. Therefore, the enterprise may use the required software functions more flexibly. However, in most SaaS environments, the same service will have operations from multiple tenants, and data isolation between different tenants is required to avoid leakage of important data. However, in some scenarios, there may be a need to share specific data between tenants.

However, in order to meet such a requirement, a corresponding cross-tenant data sharing method needs to be designed under the multi-tenant SaaS architecture. The current cross-tenant data access solutions are all designed based on relational databases, and are planned on the basis of data structures and data dependencies, so that the cross-tenant data access effect may be achieved through various exceptions under tenant data isolation. In other words, for example, users need to perform additional related queries when acquiring data, which may damage the original multi-tenant data isolation mechanism that ensures data security, and the performance is relatively unstable. Moreover, under the distributed micro-service architecture commonly used in today's SaaS environments, these designs also make the authority management of the service more difficult, and increase the complexity of artificial settings, thereby increasing the possibility of loopholes in the overall system.

SUMMARY

The disclosure provides a data sharing system and a data sharing method that may securely and quickly share data belonging to different tenants.

According to an embodiment of the disclosure, the data sharing system includes a storage device and a processor. The storage device stores multiple modules. The processor is coupled to a first software as a service (SaaS) application program, a second SaaS application program, and the storage device, and executes these modules. The modules include a mutual trust relationship service module and a tenant management service module. When the first SaaS application program sends a data sharing request to the second SaaS application program based on first tenant identification data, the mutual trust relationship service module receives a request for confirmation of a mutual trust relationship transmitted by the second SaaS application program, so as to confirm the mutual trust relationship according to mutual trust relationship data. When the mutual trust relationship is confirmed, the mutual trust relationship service module obtains virtual user identification data from the tenant management service module, and provides the virtual user identification data to the second SaaS application program, so that the second SaaS application program obtains data authority based on second tenant identification data and the virtual user identification data, and shares specific data to the first SaaS application program according to the data authority.

According to an embodiment of disclosure, the data sharing method of the disclosure includes the following steps: a request for confirmation of a mutual trust relationship transmitted by a second SaaS application program is received by a mutual trust relationship service module when a first SaaS application program sends a data sharing request to the second SaaS application program based on first tenant identification data, so the mutual trust relationship is confirmed according to mutual trust relationship data; and virtual user identification data is obtained by the mutual trust relationship service module from a tenant management service module when the mutual trust relationship is confirmed, and the virtual user identification data is provided to the second SaaS application program, so that the second SaaS application program obtains data authority based on second tenant identification data and the virtual user identification data, and shares specific data to the first SaaS application program according to the data authority.

Based on the above, the data sharing system and data sharing method of the disclosure may enable a tenant to securely and quickly obtain specific data belonging to another tenant by establishing a virtual user identity.

In order to make the above-mentioned features and advantages of the disclosure comprehensible, embodiments accompanied with drawings are described in detail as follows.

DESCRIPTION OF THE EMBODIMENTS

Figure 1:
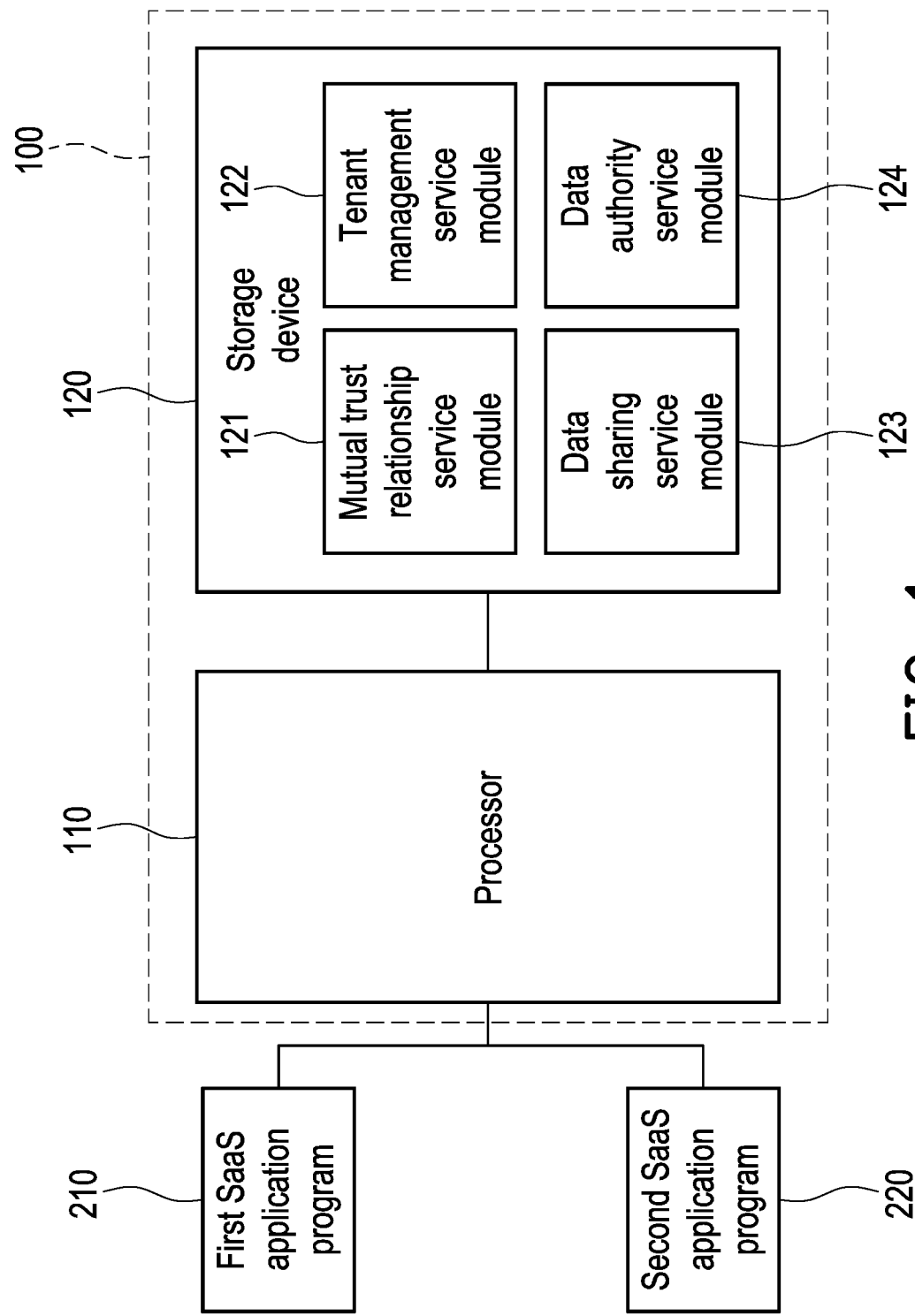
FIG. 1 is a block diagram of a data sharing system according to an embodiment of the disclosure.

Reference is now made in detail to exemplary embodiments of the disclosure, and examples of the exemplary embodiments are illustrated in the accompanying drawings. Wherever possible, the same reference numerals are used in the drawings and descriptions to refer to the same or similar parts.

FIG. 1 is a block diagram of a data sharing system according to an embodiment of the disclosure. Referring to FIG. 1, a data sharing system 100 includes a processor 110 and a storage device 120. The processor 110 is coupled to the storage device 120. The storage device 120 stores a mutual trust relationship service module 121, a tenant management service module 122, a data sharing service module 123, and a data authority service module 124. The processor 110 is further coupled to a first software as a service (SaaS) application program 210 and a second SaaS application program 220. In the embodiment, the data sharing system 100 may be implemented in, for example, an SaaS server, and the SaaS server further includes the first SaaS application program 210 and the second SaaS application program 220. In one embodiment, the first SaaS application program 210 and the second SaaS application program 220 may also be stored in the storage device 120. In another embodiment, the mutual trust relationship service module 121, the tenant management service module 122, the data sharing service module 123, and the data authority service module 124 are also disposed in multiple different servers, and are not limited to the architecture shown in FIG. 1.

It is worth noting that, in the embodiment, a tenant (e.g., an enterprise) or a user (e.g., an enterprise employee) may operate the first SaaS application program 210 and the second SaaS application program 220 to implement functions of related enterprise business management, and may exchange or share business data, but the disclosure is not limited thereto. In some embodiments of the disclosure, the first SaaS application program 210 and the second SaaS application program 220 described below may belong to the same or different application programs depending on actual application scenarios. In the embodiment, the mutual trust relationship service module 121, the tenant management service module 122, the data sharing service module 123, and the data authority service module 124 may be implemented with, for example, programming languages such as JavaScript Object Notation (JSON), Extensible Markup Language (XML), or YAML Ain't Markup Language (YAML), but the disclosure is not limited thereto.

In the embodiment, the processor 110 may include, for example, a central processing unit (CPU), or other programmable general-purpose or special-purpose microprocessors, digital signal processors (DSPs), application specific integrated circuits (ASICs), programmable logic devices (PLDs), other similar processing circuits, or combinations thereof. The storage device 120 may include a memory and/or a database, and the memory may be, for example, a non-volatile memory (NVM). The storage device 120 may store related programs, modules, systems, or algorithms useful for implementing the embodiments of the disclosure for the access and execution of the processor 110, so as to implement the related functions and operations described in the embodiments of the disclosure.

In the embodiment, when the tenant operates the first SaaS application program 210 and wants to obtain specific data of another tenant in the second SaaS application program 220, the first SaaS application program 210 may securely and quickly obtain the specific data belonging to the another tenant in the second SaaS application program 220 through the mutual trust relationship service module 121, the tenant management service module 122, the data sharing service module 123, and the data authority service module 124 without damaging the original data isolation between different tenants.

Figure 2:
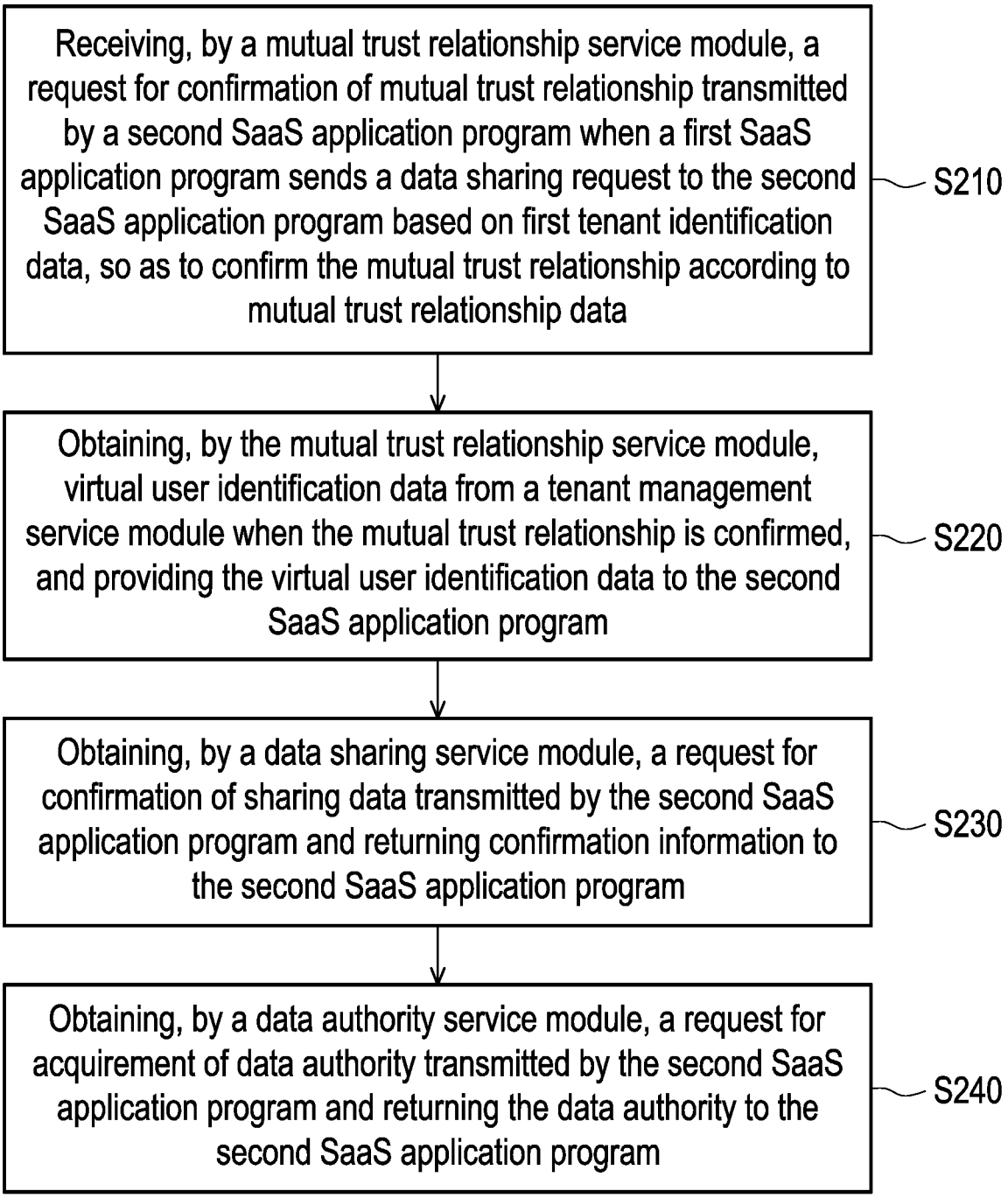
FIG. 2 is a flowchart of a data sharing method according to an embodiment of the disclosure.

FIG. 2 is a flowchart of a data sharing method according to an embodiment of the disclosure. Referring to FIGS. 1 and 2, the data sharing system 100 may perform the following steps S210 to S240. In the embodiment, the tenant may operate the first SaaS application program 210 and input first tenant identification data, and the first tenant identification data may include, for example, tenant identity information. In step S210, when the first SaaS application program 210 sends a data sharing request to the second SaaS application program 220 based on the first tenant identification data, the mutual trust relationship service module 121 may receive a request for confirmation of a mutual trust relationship transmitted by the second SaaS application program 220, so as to confirm the mutual trust relationship according to mutual trust relationship data. In step S220, when the mutual trust relationship is confirmed, the mutual trust relationship service module 121 may obtain virtual user identification data from the tenant management service module 122 and provide the virtual user identification data to the second SaaS application program 220. The virtual user identification data is pre-established for mutual approval between the tenant and the another tenant.

In step S230, the data sharing service module 123 may obtain a request for confirmation of sharing data transmitted by the second SaaS application program 220, and return confirmation information to the second SaaS application program 220. In step S240, the data authority service module 124 may obtain a request for acquirement of data authority transmitted by the second SaaS application program 220, and return authorization data to the second SaaS application program 220. In this way, the second SaaS application program 220 may obtain the data authority according to the authorization data, and may provide, for example, specific data belonging to the another tenant to the first SaaS application program 210 based on the data authority. The data sharing system and data sharing method of the embodiment may enable the first SaaS application program 210 and the second SaaS application program 220 to securely and quickly exchange data between different tenants.

Figure 3:
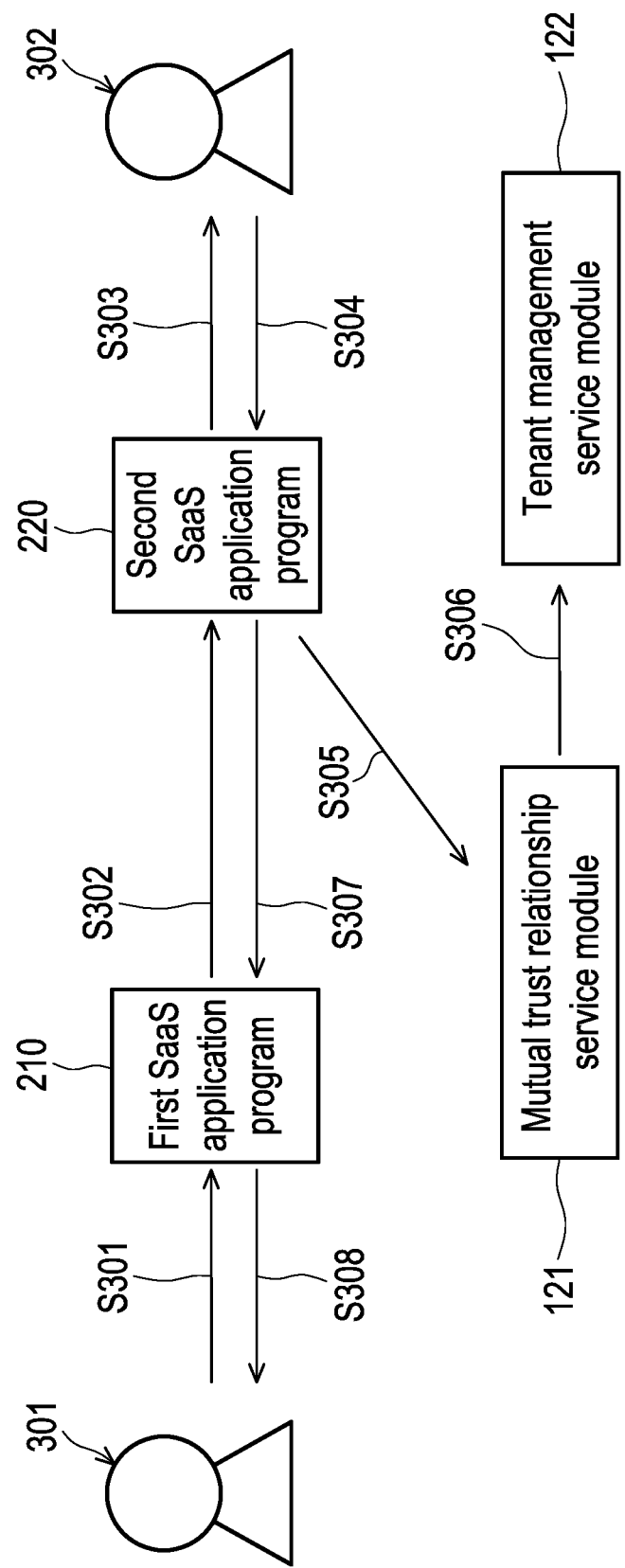
FIG. 3 is a flowchart of an application for a mutual trust relationship according to an embodiment of the disclosure.

FIG. 3 is a flowchart of an application for a mutual trust relationship according to an embodiment of the disclosure. Referring to FIGS. 1 and 3, the example describes the operation process of the application for the mutual trust relationship in detail. In step S301, a first tenant 301 may input the first tenant identification data into the first SaaS application program 210, and operate the first SaaS application program 210 to issue the application for the mutual trust relationship. In step S302, the first SaaS application program 210 sends a request for the application for the mutual trust relationship to the second SaaS application program 220. In step S303, the second SaaS application program 220 may notify a second tenant 302. In step S304, the second tenant 302 may input second tenant identification data into the second SaaS application program 220, and agree to the application for the mutual trust relationship. In step S305, the second SaaS application program 220 may provide the first tenant identification data and the second tenant identification data to the mutual trust relationship service module 121, so that the mutual trust relationship service module 121 may establish the mutual trust relationship data according to the first tenant identification data and the second tenant identification data.

In the embodiment, the mutual trust relationship data may include, for example, mutual trust relationship identification data (trustID), the first tenant identification data (tanentID1), the second tenant identification data (tanentID2), and mutual trust relationship status information (turstStatus). The mutual trust relationship status information is configured, for example, to indicate information such as application in progress, valid, rejected, and/or invalid. In one embodiment, the mutual trust relationship data may further include, for example, first-party user identification data (userID1) belonging to the first tenant 301, second-party user identification data (userID2) belonging to the second tenant 302, and additional description information (desc).

In step S306, when the mutual trust relationship service module 121 establishes the mutual trust relationship data, the mutual trust relationship service module 121 transmits a request for establishment of a virtual user to the tenant management service module 122, so that the tenant management service module 122 creates the virtual user identification data. In step S307, the second SaaS application program 220 may provide information that the mutual trust relationship is established successfully to the first SaaS application program 210. In step S308, the first SaaS application program 210 may display the information that the mutual trust relationship is established successfully to the first tenant 301, for example, through a corresponding operation interface or user interface.

In this way, the data sharing system 100 may establish the mutual trust relationship data used between the first tenant 301 and the second tenant 302, and the virtual user identification data for subsequent operations of establishing the authorization data and obtaining shared data.

Figure 4:
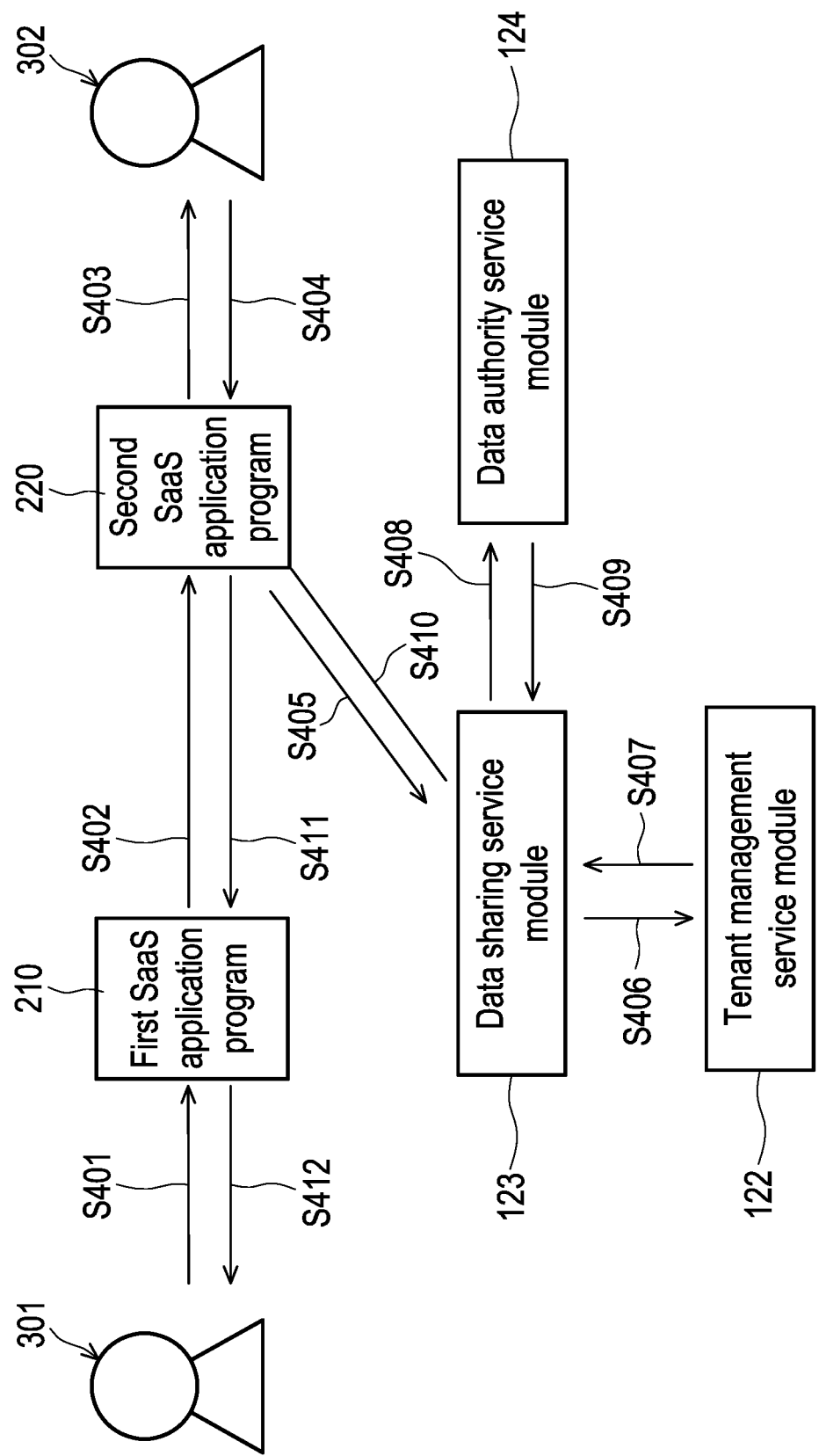
FIG. 4 is a flowchart of establishment of authorization data according to an embodiment of the disclosure.

FIG. 4 is a flowchart of establishment of authorization data according to an embodiment of the disclosure. Referring to FIGS. 1 and 4, the example describes the establishment process of the authorization data in detail. In step S401, the first tenant 301 may input the first tenant identification data into the first SaaS application program 210, and operate the first SaaS application program 210 to issue a request for establishment of the authorization data. In step S402, the first SaaS application program 210 sends the request for establishment of the authorization data to the second SaaS application program 220 based on the first tenant identification data. In step S403, the second SaaS application program 220 may notify the second tenant 302. In step S404, the second tenant 302 may input the second tenant identification data into the second SaaS application program 220, and agree to establish authorization data. In step S405, the data sharing service module 123 receives a request for confirmation of the mutual trust relationship transmitted by the second SaaS application program 220 and confirms the mutual trust relationship. The data sharing service module 123 may compare the first tenant identification data and the second tenant identification data with the mutual trust relationship data previously established by the mutual trust relationship service module 121 to determine whether the first tenant 301 and the second tenant 302 have a mutual trust relationship. When the mutual trust relationship is confirmed, in step S406, the data sharing service module 123 requests the tenant management service module 122 to provide the previously generated virtual user identification data. The tenant management service module 122 may obtain the previously established virtual user identification data according to the second tenant identification data and the mutual trust relationship data. In step S407, the tenant management service module 122 obtains the virtual user identification data from the data sharing service module 123. In step S408, the data sharing service module 123 requests the data authority service module 124 to establish permission. The data authority service module 124 generates the authorization data according to the second tenant identification data and the virtual user identification data. The authorization data is used by a virtual user.

In the embodiment, the authorization data may include, for example, the virtual user identification data (shareID), the mutual trust relationship identification data (trustID), the first tenant identification data (a data sharing recipient (receiverTanentID)), the second tenant identification data (a data sharing provider (providerTanentID)), and shared data information (resource). The shared data information may refer to information such as resources and/or services to be shared. In one embodiment, the authorization data may further include, for example, a data sharing start time (startDate), a data sharing end time (endDate), and a data sharing status (authStatus). The data sharing status is configured, for example, to indicate information such as application in progress, valid, rejected, and/or invalid. In another embodiment, the authorization data may further include, for example, the first-party user identification data belonging to the first tenant 301 (a user of data sharing recipient (receiverUserID)), and the second-party user identification belonging to the second tenant 302 (a user of data sharing provider providing (providerUserID)), additional data authority definitions (dataRange), and additional description information (desc).

In step S409, the data authority service module 124 may notify the data sharing service module 123 that the authorization data is established successfully. In step S410, the data sharing service module 123 may notify the second SaaS application program 220 that the authorization data is established successfully. In step S411, the second SaaS application program 220 may notify the first SaaS application program 210 that the authorization data is established successfully. In step S412, the first SaaS application program 210 may display the information that the authorization data is established successfully to the first tenant 301, for example, through a corresponding operation interface or user interface.

In this way, the data sharing system 100 may establish the authorization data of data sharing used between the first tenant 301 and the second tenant 302 for subsequent operations of obtaining shared data.

Figure 5:
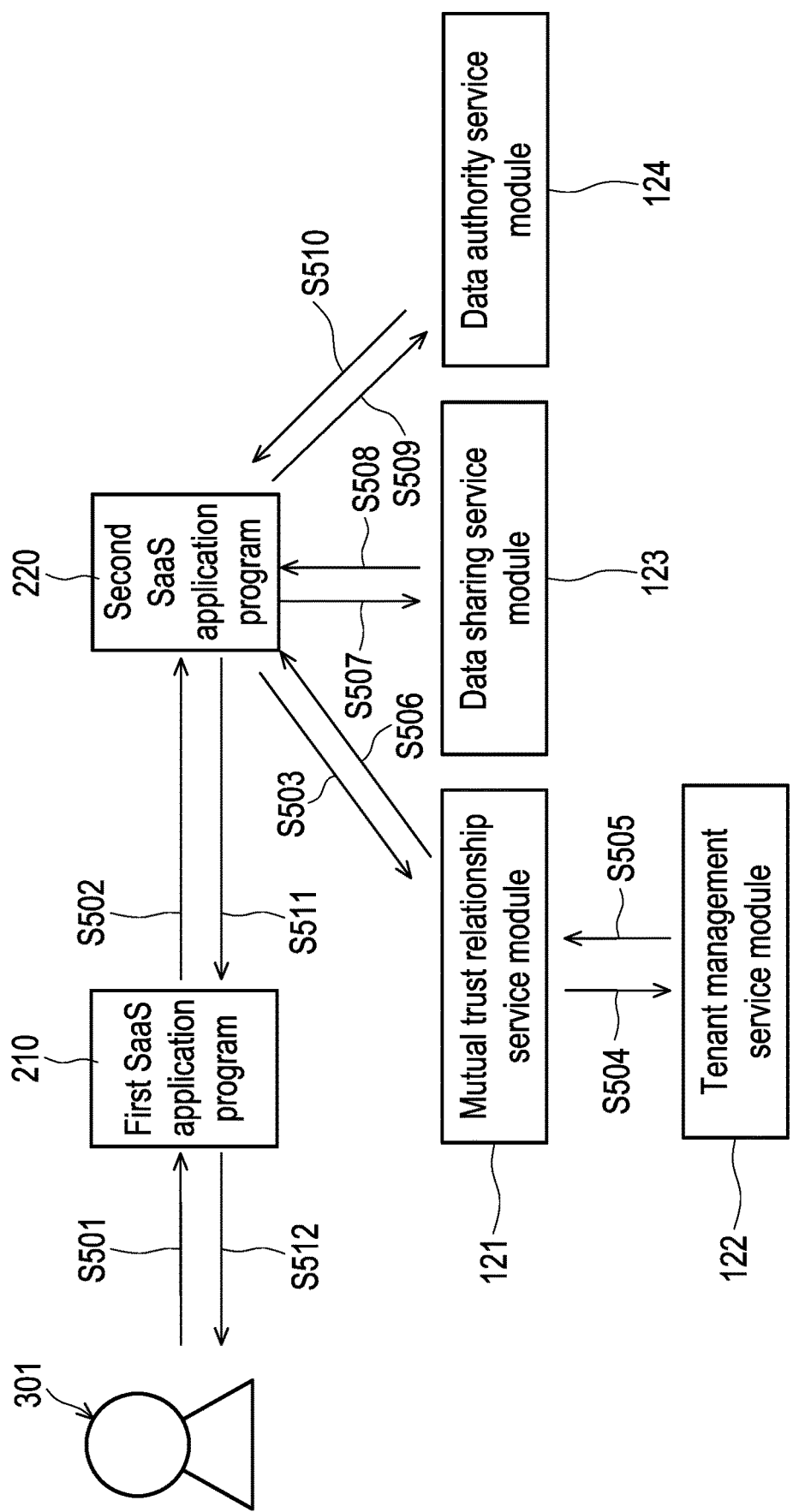
FIG. 5 is a flowchart of acquirement of shared data according to an embodiment of the disclosure.

FIG. 5 is a flowchart of acquirement of shared data according to an embodiment of the disclosure. Referring to FIGS. 1 and 5, the example describes the acquirement process of shared data in detail. In step S501, the first tenant 301 may input the first tenant identification data into the first SaaS application program 210, and operate the first SaaS application program 210 to issue a data sharing request. In step S502, the first SaaS application program 210 sends the data sharing request to the second SaaS application program 220 based on the first tenant identification data. In step S503, the mutual trust relationship service module 121 receives the request for confirmation of the mutual trust relationship transmitted by the second SaaS application program 220, so as to confirm the mutual trust relationship according to the mutual trust relationship data. The mutual trust relationship service module 121 may compare the first tenant identification data and the second tenant identification data according to the previously established mutual trust relationship data to determine whether the first tenant 301 and the second tenant 302 have a mutual trust relationship. When the mutual trust relationship is confirmed, in step S504, the mutual trust relationship service module 121 requests the tenant management service module 122 to provide the virtual user identification data. In step S505, the mutual trust relationship service module 121 may obtain the virtual user identification data from the tenant management service module 122. In step S506, the mutual trust relationship service module 121 provides the virtual user identification data to the second SaaS application program 220.

When the second SaaS application program 220 obtains the virtual user identification data, in step S507, the data sharing service module 123 may obtain a request for confirmation of sharing data transmitted by the second SaaS application program 220 to confirm the existence of the data or resources to be shared according to the first tenant identification data and the second tenant identification data. In step S508, the data sharing service module 123 may return confirmation information to the second SaaS application program 220.

When the second SaaS application program 220 obtains the virtual user identification data and the confirmation information, in step S509, the data authority service module 124 may obtain a request for acquirement of data authority transmitted by the second SaaS application program 220. In step S510, the data authority service module 124 may obtain authorization data of the virtual user according to the virtual user identification data and the second tenant identification data, and return the authorization data to the second SaaS application program 220. In step S511, the second SaaS application program 220 may obtain corresponding data authority according to the authorization data, and may share specific data to the first SaaS application program 210 based on the data authority. In step S512, the first SaaS application program 210 may display relevant application information of the specific data to the first tenant 301, for example, through a corresponding operation interface or user interface.

In this way, the data sharing system 100 may allow the first tenant 301 and the second tenant 302 to securely and quickly share their respective data, thereby realizing the function of convenient data exchange and maintaining the effect of secure data isolation. The data sharing system 100 may have a cross-tenant data sharing function.

In summary, the data sharing system and the data sharing method of the disclosure may allow different tenants to establish the mutual trust relationship data and the authorization data in advance, so as to implement a two confirmation mechanism and maintain good data isolation between different tenants. When a tenant wants to obtain data of another tenant and/or another SaaS application program through an SaaS application program, the data sharing system and the data sharing method of the disclosure may securely and quickly obtain specific data of another tenant and/or another SaaS application program through the mutual trust relationship confirmation operation and the sharing data authorization operation.

Finally, it should be noted that the above embodiments are only used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. A data sharing system, comprising:
a storage device, storing a plurality of modules; and
a processor, coupled to a first software as a service (SaaS) application program, a second SaaS application program, and the storage device, and executing the plurality of modules, wherein the plurality of modules include a mutual trust relationship service module and a tenant management service module,
wherein when the first SaaS application program sends a data sharing request to the second SaaS application program based on first tenant identification data, the mutual trust relationship service module receives a request for confirmation of a mutual trust relationship transmitted by the second SaaS application program, so as to confirm the mutual trust relationship by comparing the first tenant identification data belonging to a first tenant and second tenant identification data belonging to a second tenant with mutual trust relationship data,
wherein when the mutual trust relationship is confirmed, the mutual trust relationship service module obtains virtual user identification data from the tenant management service module, and provides the virtual user identification data to the second SaaS application program, so that the second SaaS application program obtains data authority based on the second tenant identification data and the virtual user identification data, and shares specific data belonging to the second tenant to the first SaaS application program according to the data authority.

2. The data sharing system according to claim 1, wherein the plurality of modules further comprise a data sharing service module,
wherein when the second SaaS application program obtains the virtual user identification data, the data sharing service module obtains a request for confirmation of sharing data transmitted by the second SaaS application program, and returns confirmation information to the second SaaS application program.

3. The data sharing system according to claim 2, wherein the plurality of modules further comprise a data authority service module,
wherein when the second SaaS application program obtains the virtual user identification data and the confirmation information, the data authority service module obtains a request for acquirement of data authority transmitted by the second SaaS application program, and returns authorization data to the second SaaS application program.

4. The data sharing system according to claim 3, wherein when the first SaaS application program sends a request for an application for a mutual trust relationship to the second SaaS application program based on the first tenant identification data, the mutual trust relationship service module receives a request for establishment of the mutual trust relationship transmitted by the second SaaS application program, so as to establish the mutual trust relationship data according to the first tenant identification data and the second tenant identification data.

5. The data sharing system according to claim 4, wherein when the mutual trust relationship service module establishes the mutual trust relationship data, the mutual trust relationship service module transmits a request for establishment of a virtual user to the tenant management service module, so that the tenant management service module establishes the virtual user identification data.

6. The data sharing system according to claim 5, wherein when the first SaaS application program sends a request for establishment of authorization data to the second SaaS application program based on the first tenant identification data, the data sharing service module receives a request for the confirmation of the mutual trust relationship transmitted by the second SaaS application program and confirms the mutual trust relationship,
wherein when the mutual trust relationship is confirmed, the data sharing service module obtains the virtual user identification data from the tenant management service module, and obtains the authorization data from the data authority service module.

7. The data sharing system according to claim 6, wherein the tenant management service module obtains the virtual user identification data according to the second tenant identification data and the mutual trust relationship data, and the data authority service module generates the authorization data according to the second tenant identification data and the virtual user identification data.

8. The data sharing system according to claim 1, wherein the mutual trust relationship data comprises mutual trust relationship identification data, the first tenant identification data, the second tenant identification data, and mutual trust relationship status information.

9. The data sharing system according to claim 8, wherein the authorization data comprises the virtual user identification data, the mutual trust relationship identification data, the first tenant identification data, the second tenant identification data, and shared data information.

10. The data sharing system according to claim 9, wherein the authorization data further comprises data sharing start time, data sharing end time, and data sharing status.

11. A data sharing method, comprising:
receiving, by a mutual trust relationship service module, a request for confirmation of a mutual trust relationship transmitted by a second software as a service (SaaS) application program when a first SaaS application program sends a data sharing request to the second SaaS application program based on first tenant identification data, so as to confirm the mutual trust relationship by comparing the first tenant identification data belonging to a first tenant and second tenant identification data belonging to a second tenant with mutual trust relationship data; and
obtaining, by the mutual trust relationship service module, virtual user identification data from a tenant management service module when the mutual trust relationship is confirmed, and providing the virtual user identification data to the second SaaS application program, so that the second SaaS application program obtains data authority based on the second tenant identification data and the virtual user identification data, and shares specific data belonging to the second tenant to the first SaaS application program according to the data authority.

12. The data sharing method according to claim 11, wherein instructing the second SaaS application program to obtain the data authority based on the second tenant identification data and the virtual user identification data comprises:
obtaining, by the data sharing service module, a request for confirmation of sharing data transmitted by the second SaaS application program when the second SaaS application program obtains the virtual user identification data, and returning confirmation information to the second SaaS application program.

13. The data sharing method according to claim 12, wherein instructing the second SaaS application program to obtain the data authority based on the second tenant identification data and the virtual user identification data further comprises:

obtaining, by the data authority service module, a request for acquirement of the data authority transmitted by the second SaaS application program when the second SaaS application program obtains the virtual user identification data and the confirmation information, and returning authorization data to the second SaaS application program.

14. The data sharing method according to claim 13, further comprising:
receiving, by the mutual trust relationship service module, a request for establishment of a mutual trust relationship transmitted by the second SaaS application program when the first SaaS application program sends a request for an application for the mutual trust relationship to the second SaaS application program based on the first tenant identification data, so as to establish the mutual trust relationship data according to the first tenant identification data and the second tenant identification data.

15. The data sharing method according to claim 14, further comprising:
transmitting, by the mutual trust relationship service module, a request for establishment of a virtual user to the tenant management service module when the mutual trust relationship service module establishes the mutual trust relationship data, so that the tenant management service module establishes the virtual user identification data.

16. The data sharing method according to claim 15, further comprising:
receiving, by the data sharing service module, a request for confirmation of a mutual trust relationship transmitted by the second SaaS application program and confirming the mutual trust relationship when the first SaaS application program sends a request for establishment of authorization data to the second SaaS application program based on the first tenant identification data; and
obtaining, by the data sharing service module, the virtual user identification data from the tenant management service module when the mutual trust relationship is confirmed, and obtaining the authorization data from the data authority service module.

17. The data sharing method according to claim 16, further comprising:
obtaining, by the tenant management service module, the virtual user identification data according to the second tenant identification data and the mutual trust relationship data; and
generating, by the data authority service module, the authorization data according to the second tenant identification data and the virtual user identification data.

18. The data sharing method according to claim 11, wherein the mutual trust relationship data comprises mutual trust relationship identification data, the first tenant identification data, the second tenant identification data, and mutual trust relationship status information.

19. The data sharing method according to claim 18, wherein the authorization data comprises the virtual user identification data, the mutual trust relationship identification data, the first tenant identification data, the second tenant identification data, and shared data information.

20. The data sharing method according to claim 19, wherein the authorization data further comprises data sharing start time, data sharing end time, and data sharing status.

* * * * *